United States Patent
Suzuki et al.

[11] Patent Number: 5,975,252
[45] Date of Patent: Nov. 2, 1999

[54] DISK BRAKE

[75] Inventors: Shinji Suzuki; Hideaki Ishi, both of Yamanashi-ken; Kazuhiro Doi; Tadashi Tamasho, both of Kanagawa-ken, all of Japan

[73] Assignees: Tokico, Ltd.; Nissan Motor Co., Ltd., both of Kanagawa-ken, Japan

[21] Appl. No.: 09/079,858

[22] Filed: May 15, 1998

[30] Foreign Application Priority Data

May 16, 1997 [JP] Japan ................................. 9-143349

[51] Int. Cl.⁶ ............................................. F16D 65/04
[52] U.S. Cl. ................... 188/73.1; 188/71.8; 188/73.36; 188/250 E; 188/1.11 W
[58] Field of Search ........................ 188/73.1, 73.37, 188/73.35, 73.36, 250 B, 250 E, 71.1, 72.4, 73.38, 73.39, 73.44, 73.45, 71.7, 71.8, 1.11 W

[56] References Cited

U.S. PATENT DOCUMENTS

| | | | |
|---|---|---|---|
| 3,477,551 | 11/1969 | Beuchle et al. | 188/250 B |
| 3,885,651 | 5/1975 | Odier | 188/73.37 |
| 3,918,555 | 11/1975 | Rath | 188/73.37 |
| 4,154,322 | 5/1979 | Yamamoto et al. | 188/250 B |
| 4,993,520 | 2/1991 | Goddard et al. | 188/73.1 |
| 5,282,521 | 2/1994 | Leist et al. | 188/73.45 |
| 5,320,200 | 6/1994 | Hashimoto | 188/250 B |
| 5,407,034 | 4/1995 | Vydra et al. | 188/250 B |
| 5,416,962 | 5/1995 | Passarella | 188/73.37 |
| 5,467,846 | 11/1995 | Abe et al. | 188/73.37 |
| 5,515,950 | 5/1996 | Kwolek | 188/250 B |

*Primary Examiner*—Robert J. Oberleitner
*Assistant Examiner*—Thomas J. Williams
*Attorney, Agent, or Firm*—Wenderoth, Lind & Ponack, L.L.P.

[57] ABSTRACT

Two shim plates provided for a friction pad are arranged to be slidable relative to each other in the circumferential direction of a disk, thereby suppressing the transmission of rotational force from the disk to a caliper through the friction pad and so forth during a braking operation. A friction pad including a lining and a backing plate is disposed between the disk and an outer leg portion of the caliper. An inner shim plate is integrally mounted on the back of the backing plate. An outer shim plate is disposed between the inner shim plate and the outer leg portion of the caliper in such a manner as to be slidable relative to the inner shim plate in the circumferential direction of the disk. During a braking operation, when the friction pad pressed by the caliper is circumferentially displaced by being dragged by the disk, the inner shim plate, together with the friction pad, slides relative to the outer shim plate, thereby reducing rotational force transmitted from the disk to the caliper.

10 Claims, 8 Drawing Sheets

DISK BRAKE

BACKGROUND OF THE INVENTION

The present invention relates to a disk brake suitably used to apply braking force to a vehicle, for example.

A generally known disk brake includes a caliper and a torque receiving member slidably supporting the caliper through pin members and allowing the caliper to move in the axial direction of a disk. A friction pad is provided between the caliper and the disk and pressed against the disk by the caliper. First and second shim plates are provided between the caliper and the back of the friction pad such that the shim plates are overlaid on one another. This type of disk brake is disclosed, for example, in Japanese Utility Model Application Public Disclosure (KOKAI) No. 2-426 (1990).

In the conventional disk brake of the type described above, the caliper extends over from one side to the other side of the disk to press the inner and outer friction pads against the disk. The caliper has an inner leg portion disposed on the inner side of the disk, a bridge portion extending from the inner leg portion to the outer side of the disk, and an outer claw portion provided at the distal end of the bridge portion to lie on the outer side of the disk.

The inner leg portion of the caliper is slidably mounted on a mounting member which is secured to a non-rotating portion of a vehicle and which serves as a torque receiving member. The caliper is supported by the mounting member so as to be movable in the axial direction of the disk. Friction pads are provided on both sides of the disk. One friction pad is disposed between the disk and the inner leg portion of the caliper. The other friction pad is disposed between the disk and the outer claw portion of the caliper.

When the brake is activated, a piston provided in the inner leg portion of the caliper is caused to slide toward the disk by an externally supplied hydraulic pressure, thereby pressing the inner friction pad against the disk. In addition, the whole caliper slides toward the inner side relative to the mounting member by receiving counterforce from the piston, causing the outer claw portion to press the outer friction pad against the disk. Thus, the disk is given braking force from both sides by the friction pads.

In this case, each friction pad is dragged by rotational force from the disk during the braking operation, and the circumferential displacement of the friction pad is received by the mounting member. According to the conventional technique, one or two shim plates are attached to the backing plate of each friction pad. In the case of the outer friction pad, for example, the one or two shim plates are clamped between the back of the friction pad and the outer claw portion of the caliper when the brake is activated, thereby preventing the generation of brake noise or an extraordinary sound during the braking operation. Moreover, the two shim plates are mounted in such a manner as to be overlaid on one another, thereby improving the durability and resistance to deterioration of the inner shim plate, coated with rubber, for example.

According to the above-described conventional technique, of the first and second shim plates attached to the outer friction pad, for example, at least one shim plate that is pressed by the outer claw portion of the caliper is integrally mounted on the back of the friction pad.

When the brake is activated, the outer claw portion of the caliper strongly presses the friction pad against the disk through the shim plates. Therefore, the frictional torque acting between the friction pad and the shim plates in the circumferential direction of the disk increases, and it becomes easy for rotational force of the disk to be transmitted to the outer claw portion of the caliper through the friction pad and the shim plates.

Because the caliper is merely supported at its inner leg portion by the mounting member, if the rotational force of the disk is transmitted to the outer claw portion, the outer claw portion side of the caliper is dragged in the rotational direction of the disk, causing the caliper to be flexurally deformed to tilt with respect to the mounting member. Consequently, the outer claw portion of the caliper, which should press the friction pad against the disk in parallel, may be slightly inclined.

Accordingly, the conventional technique suffers from the problem that the pressing force (surface pressure) of the outer claw portion for pressing the friction pad to apply the brakes becomes non-uniform, and this causes the outer friction pad to wear non-uniformly, resulting in a reduction of the lifetime of the friction pad. Even after the brakes have been released, a large dragging torque acts, and the caliper tilts and presses the pad. Consequently, the variation in the thickness in the circumferential direction of the braking surface of the disk increases, causing judder or other similar problems. Thus, the conventional disk brake is likely to have adverse effects on the drivability of the vehicle.

In the conventional technique, the shim plate coated with rubber or the like and the caliper are brought into direct contact with each other. Therefore, when the brake is activated, the frictional torque occurring between the caliper and the friction pad (shim plate) further increases, and it is more likely that the caliper will be tilted by rotational force transmitted from the disk to the outer claw portion.

BRIEF SUMMARY OF THE INVENTION

In view of the above-described problems associated with the conventional technique, an object of the present invention is to provide a disk brake designed so that during a braking operation, the transmission of rotational force from the disk to the caliper through the friction pad can be surely suppressed, and the caliper can be stably pressed against the friction pad, and further that non-uniform wear of the friction pad can be surely prevented, and the brake performance and lifetime can be improved to a considerable extent.

The present invention is applicable to a disk brake having a caliper movable in the axial direction of a disk. A torque receiving member supports the caliper through a pin member such that the caliper is slidable in the axial direction of the disk. A friction pad is provided between the caliper and the disk. The friction pad is pressed against the disk by the caliper. First and second shim plates are provided between the caliper and the back of the friction pad in such a manner that the first and second shim plates are overlaid on one another.

An arrangement adopted by the present invention is characterized in that the first shim plate, which is brought into contact with the back of the friction pad, has a securing claw portion which is engaged with the friction pad, and the second shim plate is slidably mounted at the rear of the friction pad, and that the coefficient of friction between the contact surface of the second shim plate and the contact surface of the first shim plate is smaller than the coefficient of friction between the contact surface of the second shim plate and the contact surface of the caliper.

By virtue of the above-described arrangement, the first shim plate can be mounted on the back of the friction pad by the securing claw portion. Because the second shim plate is more readily slidable relative to the first shim plate than to the caliper, when the first shim plate is circumferentially displaced together with the friction pad during a braking operation, the first shim plate can slide relative to the second shim plate in a state where the second shim plate maintains a predetermined contact position with respect to the caliper. The sliding between the first shim plate and the second shim plate makes it possible to reduce the rotational force transmitted from the disk to the caliper and to prevent the second shim plate from being displaced relative to the caliper which would otherwise occur when the second shim plate is dragged by the first shim plate.

DETAILED DESCRIPTION OF THE INVENTION

Embodiments of the present invention will be described below in detail with reference to the accompanying drawings.

FIGS. 1 to 7 show a first embodiment of the present invention.

In the figures, a disk 1 rotates together with a wheel of an automobile. A mounting member 2 serves as a torque receiving member, which is integrally mounted on a non-rotating portion (not shown) of the automobile at a position on the inner side of the disk 1. The mounting member 2 has a pair of arm portions 3 and a connecting portion 4, which are integrally formed. The arm portions 3 are spaced apart from each other in the circumferential direction of the disk 1 and axially extend over the outer periphery of the disk 1. The connecting portion 4 connects together the proximal ends of the arm portions 3.

Figure 1:
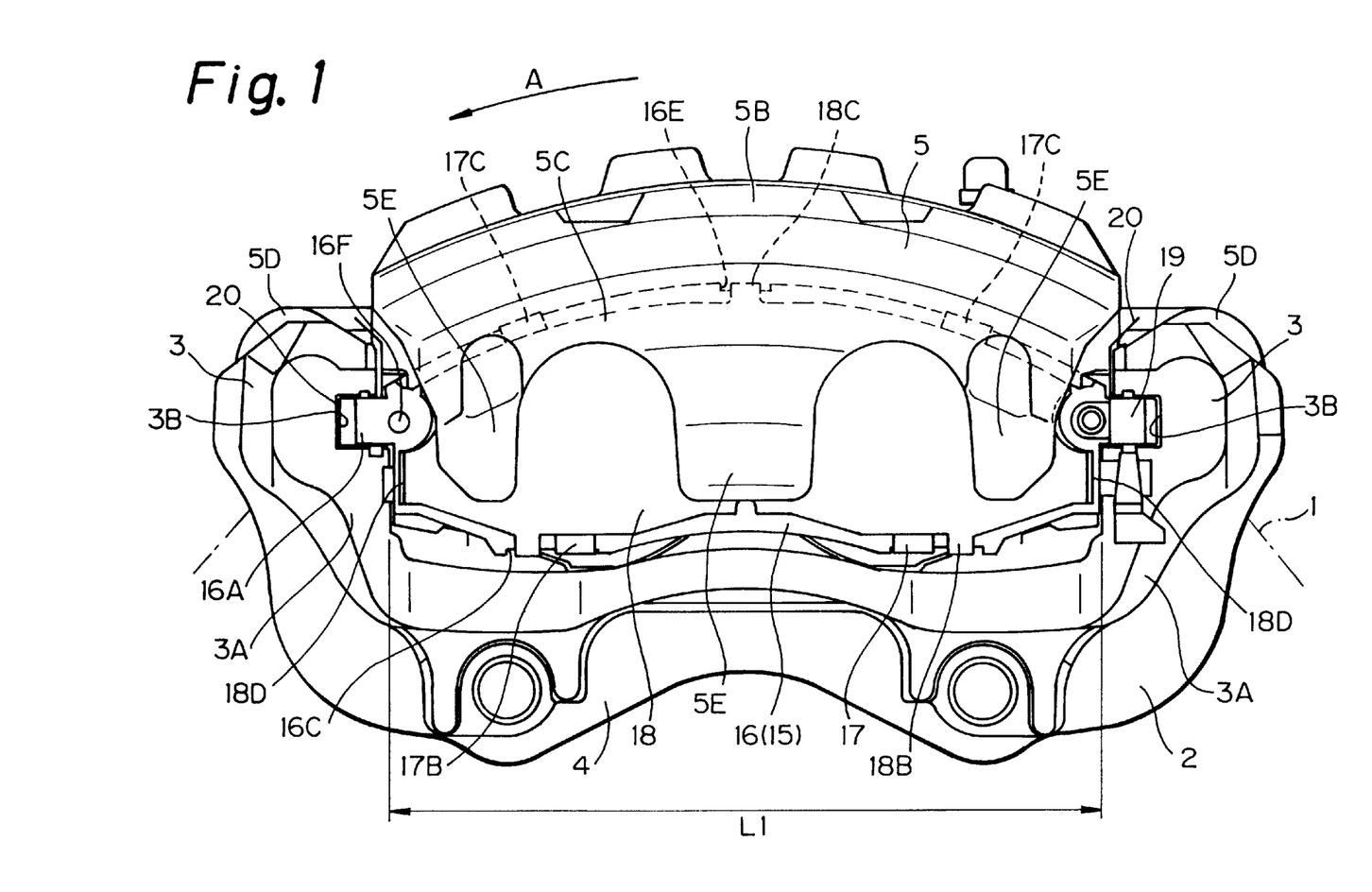
FIG. 1 is a front view of a disk brake according to a first embodiment of the present invention.

Each arm portion 3 has torque receiving portions 3A formed at its proximal (inner) and distal (outer) ends, respectively. The torque receiving portions 3A project radially inward of the disk 1. The torque receiving portions 3A of the two arm portions 3 are provided on the entrance and exit sides of the disk 1 to face opposite to each other at a predetermined distance L1. Each arm portion 3 further has pad guide portions 3B formed at its inner and outer ends, respectively. The pad guide portions 3B have an approximately U-shaped cross-section and slidably guide friction pads 10 and 15 (described later) in the axial direction of the disk 1 with pad springs 20 interposed therebetween.

Figure 2:
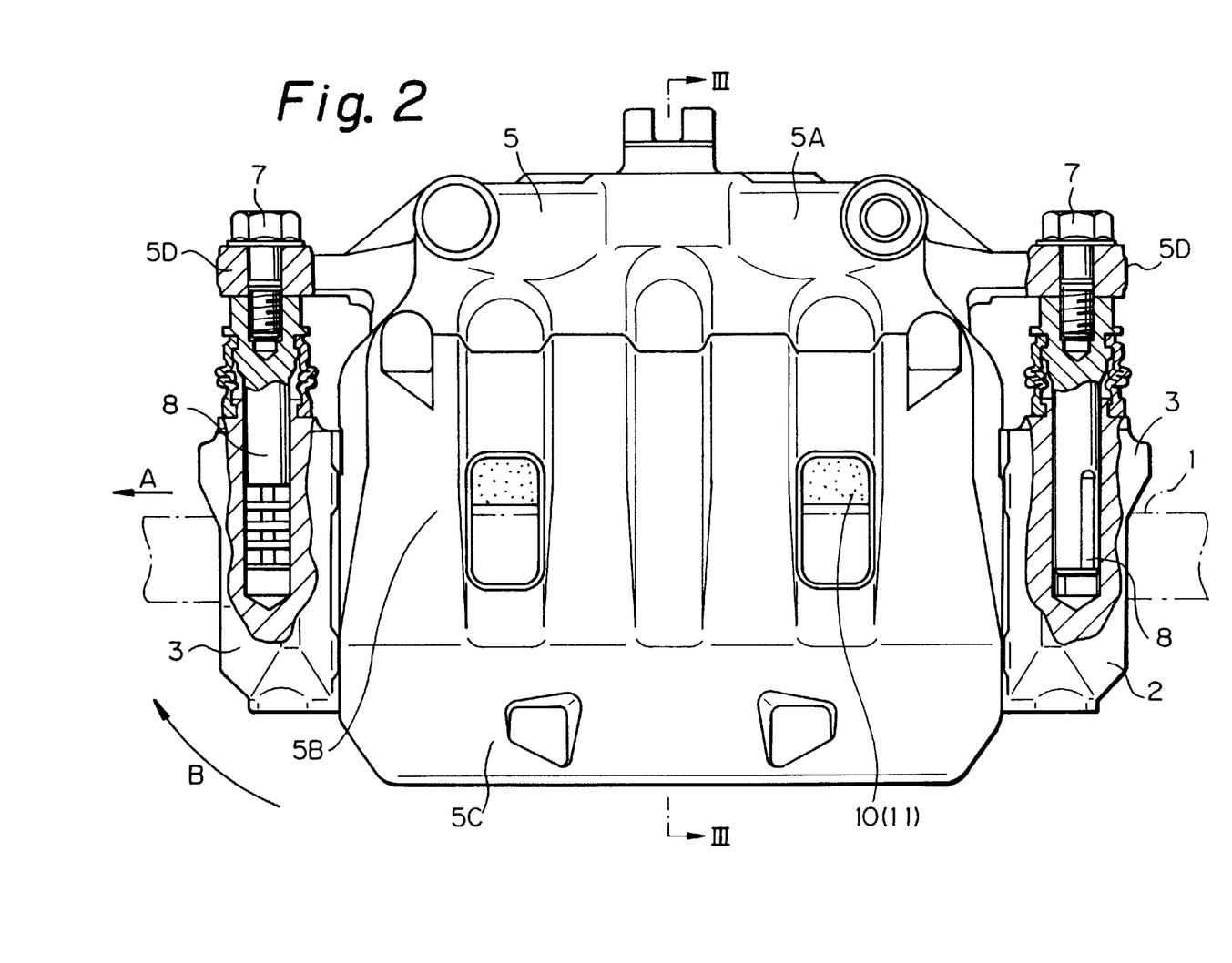
FIG. 2 is a partly-cutaway plan view of the disk brake shown in FIG. 1.
Figure 3:
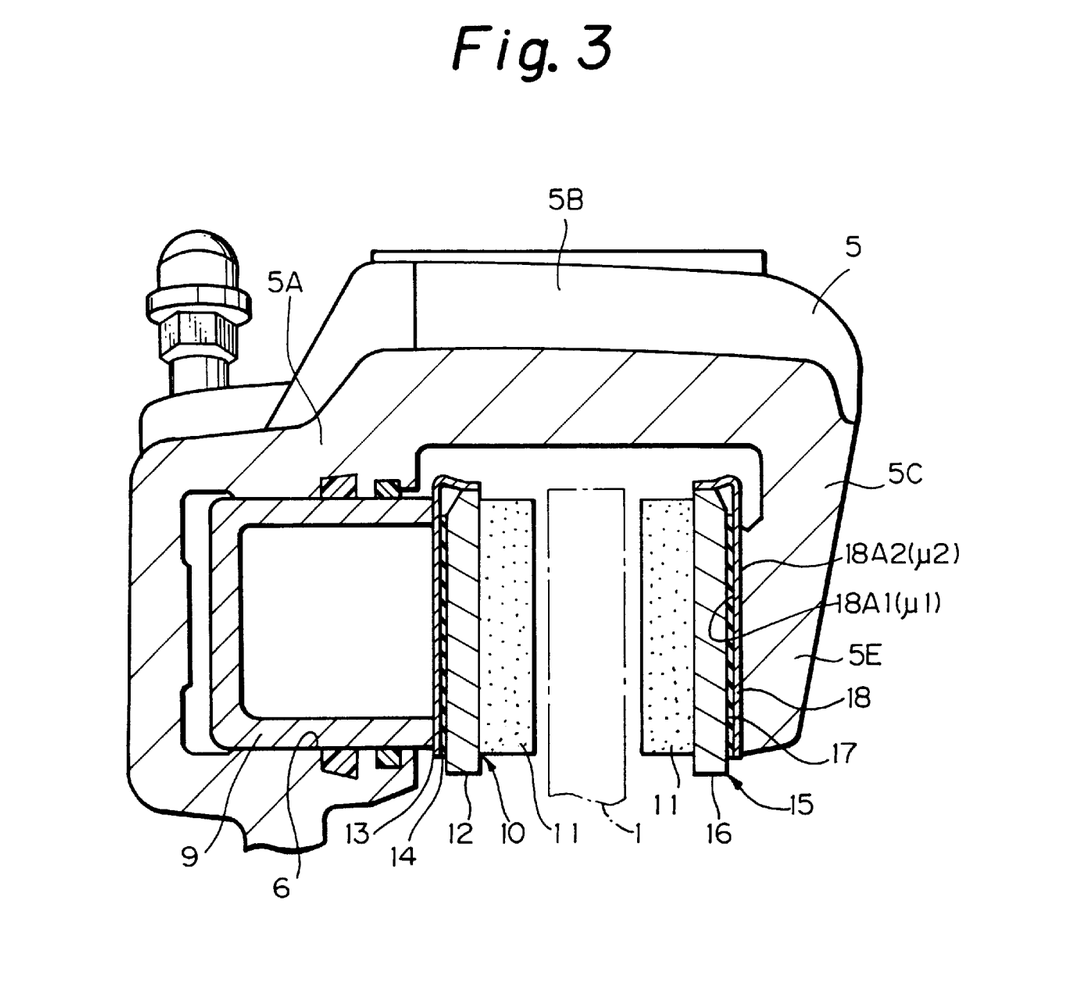
FIG. 3 is a sectional view as seen from the direction of the arrow III—III in FIG. 2.

A caliper 5 is slidably supported by the mounting member 2. As shown in FIGS. 2 and 3, the caliper 5 is made of a steel material having toughness, e.g. FCD450. The caliper 5 has an inner leg portion 5A disposed on the inner side of the disk 1. A bridge portion 5B extends from the inner leg portion 5A toward the outer side of the disk 1. An outer leg portion 5C is integrally formed at the distal end of the bridge portion 5B. The outer leg portion 5C is disposed on the outer side of the disk 1. A pair of mounting portions 5D project rightward and leftward (as viewed in FIG. 2) from both ends of the inner leg portion 5A.

A cylinder 6 is formed in the inner leg portion 5A. A piston 9 (described later) is slidably fitted in the cylinder 6. As shown in FIG. 1, the outer leg portion 5C has three outer claw portions 5E spaced apart from each other in the width direction of the friction pad 15. A pair of sliding pins 8 are integrally fitted to the mounting portions 5D through bolts 7. Thus, the caliper 5 is mounted on the mounting member 2 so as to be slidable in the axial direction of the disk 1 through the sliding pins 8.

A piston 9 presses the friction pads 10 and 15 against the disk 1. As shown in FIG. 3, the piston 9 is formed in a circular cup-like shape. The bottom portion of the piston 9 is slidably fitted in the cylinder 6 provided in the inner leg portion 5A. When a brake fluid is externally supplied, the piston 9 slides in the cylinder 6, causing the friction pads 10 and 15 to be pressed against the disk 1.

The friction pad 10 is an inner friction pad which is disposed between the inner leg portion 5A of the caliper 5 and the disk 1. As shown in FIGS. 2 and 3, the friction pad 10 has a lining 11 which comes in friction contact with the disk 1 when the brake is activated. A metal backing plate 12 is rigidly secured to the lining 11 in such a manner as to be overlaid on the back of the lining 11. The friction pad 10 has an arrangement approximately similar to that of the outer friction pad 15 (described later).

A shim plate 13 is mounted on the back of the backing plate 12. The shim plate 13 is made from an anti-corrosive metal plate, e.g. a stainless steel plate. Another shim plate 14 is disposed between the backing plate 12 and the shim plate 13. The shim plate 14 is coated with rubber or other similar material.

When the brake is activated, the friction pad 10 is pressed against the disk 1 by the piston 9 through the shim plates 13 and 14. At this time, the shim plate 13 uniforms the surface pressure applied to the friction pad 10 from the piston 9, thereby preventing deterioration of the shim plate 14. On the other hand, the shim plate 14 is adapted to reduce the brake noise by the rubber coating, for example.

Figure 4:
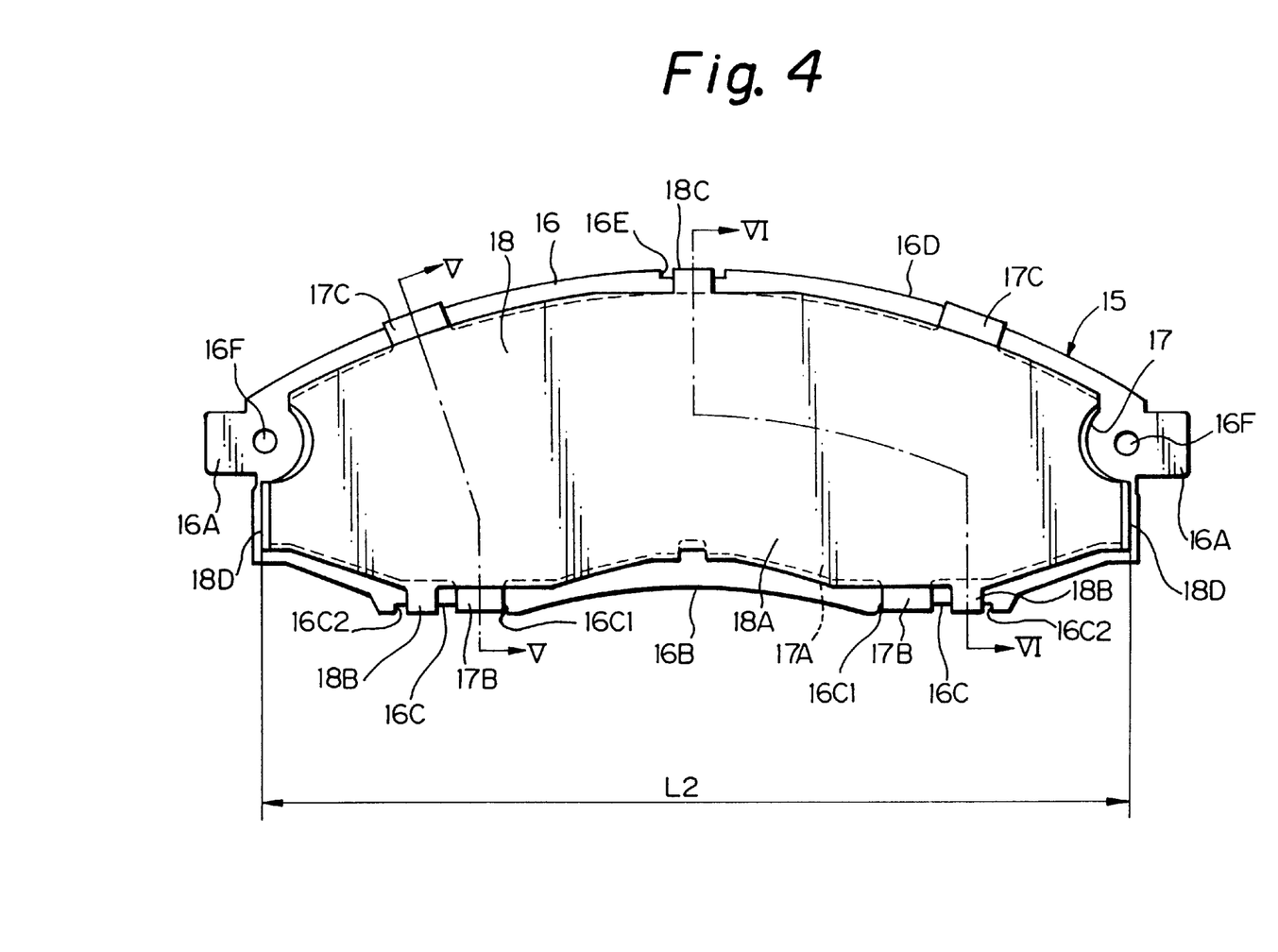
FIG. 4 is a front view showing inner and outer shim plates as attached to a friction pad in the disk brake shown in FIG. 1.

The outer friction pad 15 has almost the same arrangement as the inner friction pad 10. As shown in FIGS. 1 and 4, the friction pad 15 is elongated in the circumferential direction of the disk 1 in an approximately fan-like shape. The friction pad 15 has a lining 11 similar to that of the inner friction pad 10. A metal backing plate 16 (described later) is rigidly secured to the back of the lining 11.

As shown in FIG. 3, the friction pad 15 is disposed between the outer leg portion 5C of the caliper 5 and the disk 1. The backing plate 16 is brought into contact with the outer claw portions 5E of the outer leg portion 5C through a pair of inner and outer shim plates 17 and 18 (described later). When the brake is activated, the friction pad 15 is pressed against the disk 1 by the outer claw portions 5E.

As shown in FIG. 4, the backing plate 16, which forms the back of the friction pad 15, has lugs 16A projecting from both ends thereof. The backing plate 16 further has a pair of horizontally spaced guide recesses 16C formed on its inner peripheral edge 16B, which lies at the radially inner side of the disk 1. The outer peripheral edge 16D of the backing plate 16, which is located at the radially outer side of the disk 1, has a single guide recess 16E formed in a circumferentially central portion thereof. The guide recesses 16C and 16E guide the outer shim plate 18 circumferentially.

The bottoms of the guide recesses 16C and 16E extend parallel to each other in a tangential direction with respect to the circumferential direction at the guide recess 16E in order to guide the outer shim plate 18 smoothly. Of side walls at both ends of each guide recess 16C, one side wall that is closer to the circumferentially central portion serves as a stopper 16C1 for positioning the inner shim plate 17 relative to the circumferential direction of the disk 1. The other side wall serves as a stopper 16C2 for preventing the outer shim plate 18 from coming off the guide recess 16C.

As shown in FIG. 4, the backing plate 16 has a pair of projections 16F for mounting a wear detecting member 19 (described later). The projections 16F project from the back of the backing plate 16 at approximately right angles thereto. The projections 16F are disposed at both longitudinal ends of the backing plate 16 in bilateral symmetric relation to each other, thereby enabling the outer friction pad 15 to be common to right and left wheels, for example. As shown in FIG. 1, each lug 16A of the backing plate 16 is fitted into the pad guide portion 3B of each arm 3 through a pad spring 20. Thus, the friction pad 15 is supported by the pad guide portions 3B, together with the inner friction pad 10, so as to be slidable in the axial direction of the disk 1.

Figure 5:
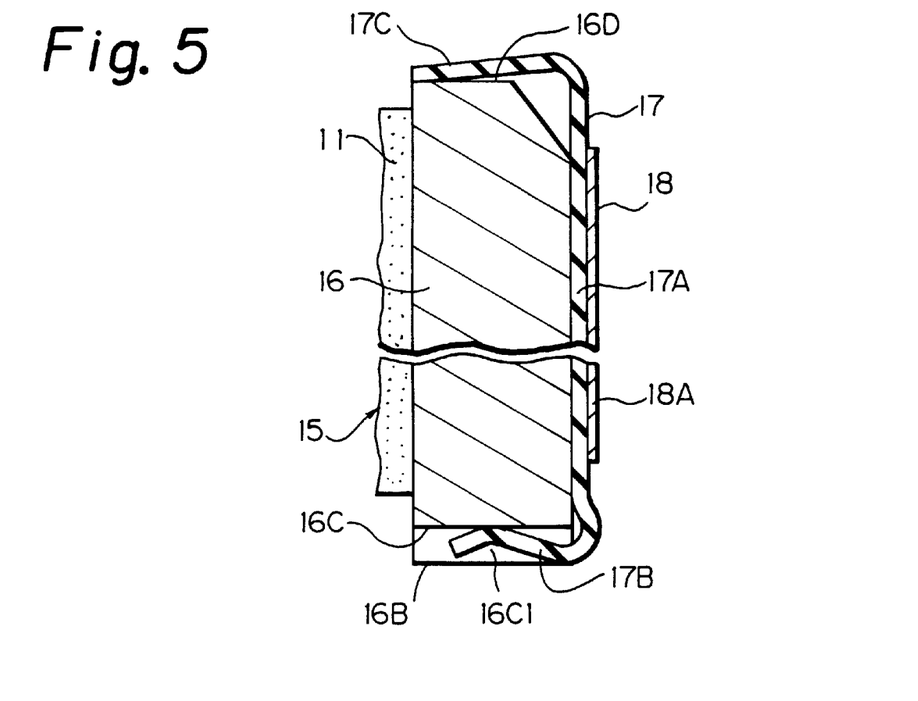
FIG. 5 is an enlarged sectional view as seen from the direction of the arrow V—V in FIG. 4.
Figure 6:
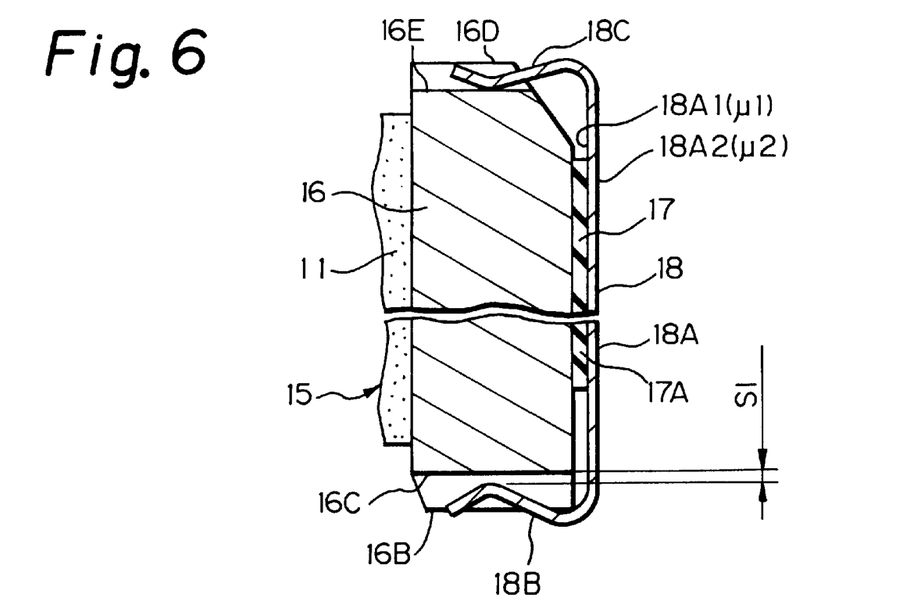
FIG. 6 is an enlarged sectional view as seen from the direction of the arrow VI—VI in FIG. 4.

The inner shim plate 17 is a first shim plate mounted on the back of the friction pad 15. As shown in FIGS. 4 to 7, the shim plate 17 is formed in a plate-like shape by coating both sides of a steel plate (not shown) with a material which has a relatively large coefficient of friction and is softer than the backing plate 16, e.g. a hard rubber or a resin material. The overall external size of the inner shim plate 17 is slightly smaller than that of the backing plate 16. The inner shim plate 17 has a shim body 17A which contacts the back of the backing plate 16 and which extends circumferentially of the disk 1 between the projections 16F. A pair of horizontally spaced securing claw portions 17B are integrally formed on the inner peripheral edge of the shim body 17A. In addition, a pair of horizontally spaced securing claw portions 17C are integrally formed on the outer peripheral edge of the shim body 17A. As shown in FIGS. 5 and 6, the securing claw portions 17B and 17C are bent to extend from the shim body 17A in the direction of the thickness of the friction pad 15.

The securing claw portions 17B engage in the corresponding guide recesses 16C of the backing plate 16 and abut on the respective stoppers 16C1. The securing claw portions 17C engage with the outer peripheral edge 16D of the backing plate 16. Thus, the inner shim plate 17 is prevented by the securing claw portions 17B and 17C from being displaced relative to the backing plate 16 in both the radial and circumferential directions of the disk 1, and in this state, the inner shim plate 17 is secured to the back of the backing plate 16.

The outer shim plate 18 is a second shim plate provided on the back of the friction pad 15 so as to be overlaid on the inner shim plate 17. As shown in FIGS. 1 and 4, the outer shim plate 18 has a shim body 18A which is made from an anti-corrosive metal plate, e.g. a stainless steel plate. The shim body 18A has a length L2 and extends circumferentially of the disk 1 along the back of the backing plate 16. A pair of horizontally spaced guide claw portions 18B are integrally formed on the inner peripheral edge of the shim body 18A. A single guide claw portion 18C is integrally formed on the outer peripheral edge of the shim body 18A.

Figure 7:
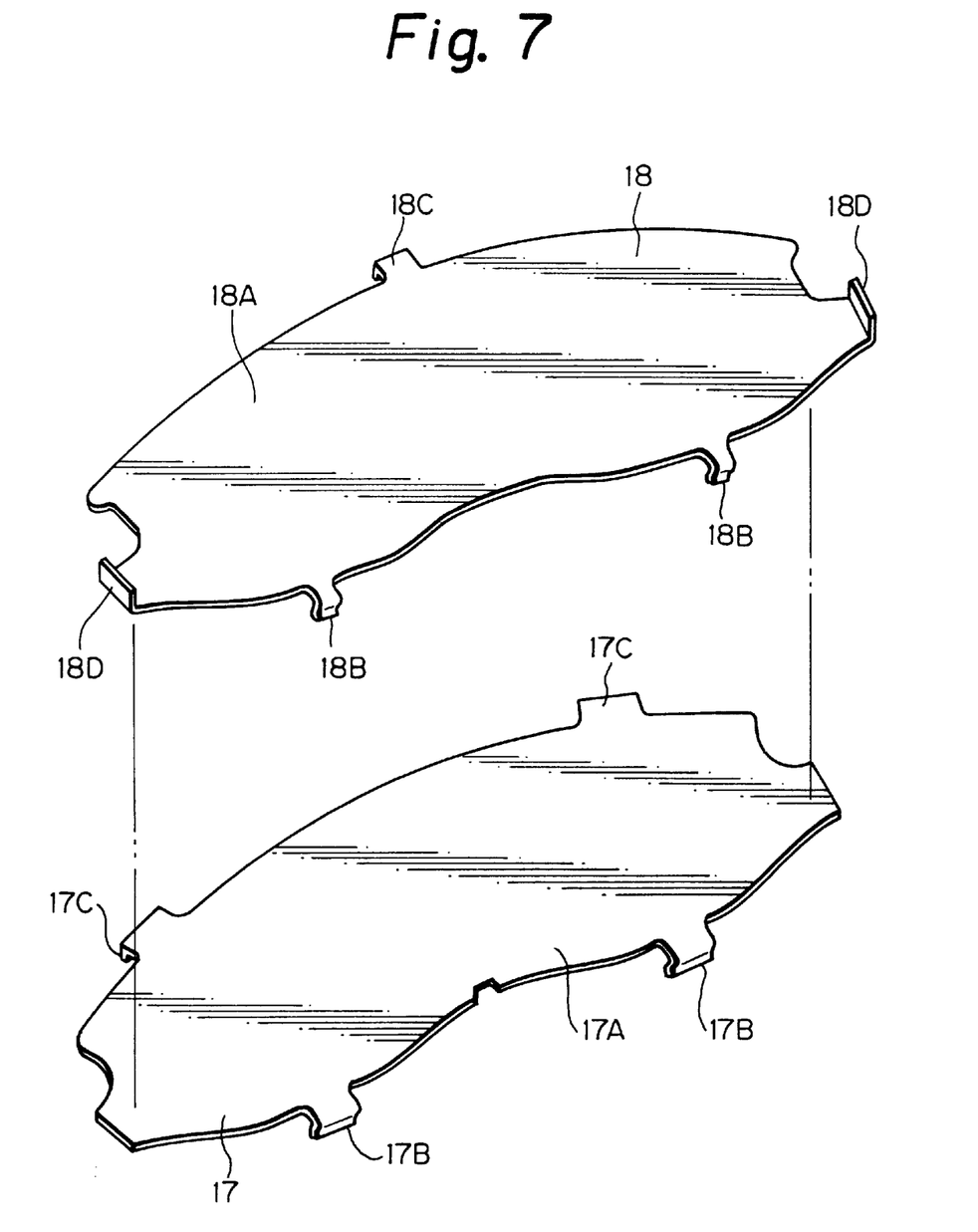
FIG. 7 is a perspective view showing the inner and outer shim plates in FIG. 4.

The shim body 18A has an external shape approximately similar to that of the shim body 17A of the inner shim plate 17. As shown in FIG. 7, the shim body 18A has bent portions 18D integrally formed at both longitudinal ends thereof by bending the end portions away from the backing plate 16 at approximately right angles to the surface of the shim body 18A. The outer shim plate 18 is readily slidable relative to the inner shim plate 17. Therefore, the bent portions 18D of the outer shim plate 18 may come into contact with the torque receiving portions 3A of the mounting member 2 by a braking action or rebound when the brake is activated. In such a case, the surface pressure applied to the contact portions is reduced by the planar portions of the bent portions 18D. It is preferable to coat the contact surfaces of the shim bodies 17A and 18A with a lubricant, e.g. grease, in order to enable the shim bodies 17A and 18A to slide smoothly.

As shown in FIGS. 5 and 6, the guide claw portions 18B and 18C bend to extend from the shim body 17A in the direction of the thickness of the friction pad 15 and engage in the corresponding guide recesses 16C and 16E of the backing plate 16. In this state, a gap is formed between each of the guide claw portions 18B and 18C and the associated guide recess 16C or 16E of the backing plate 16. The gap has a dimension S1 of the order, for example, of from 0.1 millimeter to 1.5 millimeters in the radial direction of the disk 1. The guide claw portions 18B and 18C are slidable in the circumferential direction of the disk 1 within the guide recesses 16C and 16E of the backing plate 16.

Thus, the outer shim plate 18 is slidable within a predetermined range in the circumferential direction of the disk 1 relative to the backing plate 16 while being guided by the guide claw portions 18B and 18C. At the same time, radial displacement of the outer shim plate 18 relative to the backing plate 16 is limited. Moreover, the shim body 18A is slidable relative to the shim body 17A of the inner shim plate 17 through the lubricant or the like.

As shown in FIG. 3, the outer shim plate 18 is disposed between the outer leg portion 5C of the caliper 5 and the disk 1, together with the friction pad 15 and the inner shim plate 17, lying between the torque receiving portions 3A of the mounting member 2. The back of the outer shim plate 18 is in contact with the outer claw portions 5E of the outer leg portion 5C.

The shim body 18A of the outer shim plate 18 is arranged such that the friction coefficient $\mu 1$ at the obverse side 18A1 with respect to the shim body 17A of the inner shim plate 17 is smaller than the friction coefficient $\mu 2$ at the reverse side 18A2 with respect to the outer claw portions 5E of the caliper 5 (i.e. $\mu 1 < \mu 2$). The friction coefficient $\mu 1$ of the shim body 18A with respect to the shim body 17A is made sufficiently small by the lubricant.

The length L2 of the shim body 18A of the outer shim plate 18 is set slightly shorter than the distance L1 between the torque receiving portions 3A of the mounting member 2

(i.e. L1>L2), e.g. by from 0.1 millimeter to 1.0 millimeter, thereby limiting the displacement of the outer shim plate 18 relative to the torque receiving portions 3A in the circumferential direction of the disk 1 and allowing the outer shim plate 18 to contact either of the torque receiving portions 3A in a stable state through the associated bent portion 18D. It should be noted that even if the outer shim plate 18, when sliding circumferentially, contacts either of the torque receiving portions 3A through the associated bent portion 18D, the function (effect) that enables the outer shim plate 18 to slide circumferentially relative to the inner shim plate 17 is not lost.

A metallic wear detecting member 19 is secured to one of the projections 16F of the backing plate 16 by caulking. As shown in FIG. 1, the wear detecting member 19 extends from the back of the backing plate 16 in an approximately U-like shape, and the distal end of the wear detecting member 19 faces the disk 1 at a predetermined distance. When the lining 11 of the friction pad 15 has become worn as far as a predetermined position, the wear detecting member 19 comes in sliding contact with the disk 1 and produces an extraordinary sound, thereby detecting the wear of the friction pad 15 and giving an alarm to the driver.

A pair of pad springs 20 are provided in the respective pad guide portions 3B of each arm portion 3. As shown in FIG. 1, the pad springs 20, in combination with the pad guide portions 3B, guide the friction pads 10 and 15 through the lugs 16A of the backing plate 16 and so forth such that the friction pads 10 and 15 are slidable in the axial direction of the disk 1.

The following is a description of the operation of the disk brake according to this embodiment, which has the above-described arrangement.

First, when the driver conducts a braking operation, the piston 9, shown in FIG. 3, is externally supplied with a hydraulic pressure to slide toward the disk 1 in the cylinder 6 of the caliper 5, causing the inner friction pad 10 to be pressed against the disk 1 through the shim plates 13 and 14. Then, the whole caliper 5 is caused to slide toward the inner side of the disk 1 by counterforce from the piston 9. Consequently, the outer claw portions 5E press the outer friction pad 15 against the disk 1 through the outer shim plate 18 and the inner shim plate 17. Thus, the disk 1 is given braking force from both sides by the friction pads 10 and 15.

At this time, the outer friction pad 15 is subjected to a dragging rotational force from the disk 1 and thus urged to be displaced in the rotational direction A of the disk 1 between the torque receiving portions 3A of the mounting member 2, shown in FIG. 1. In this case, if rotational force from the disk 1 acts strongly on the outer leg portion 5C of the caliper 5 through the friction pad 15 and so forth, the outer leg portion 5C may be displaced so as to tilt slightly in the direction of the arrow B in FIG. 2 because the caliper 5 is supported only at the mounting portions 5D, which are provided on the inner side, by the mounting member 2 through the sliding pins 8 and so forth.

Therefore, in this embodiment, the outer shim plate 18 is provided on the backing plate 16 of the friction pad 15 so as to be slidable in the circumferential direction of the disk 1 relative to the inner shim plate 17, and the friction coefficient $\mu1$ of the outer shim plate 18 with respect to the inner shim plate 17 is set smaller than the friction coefficient $\mu2$ of the outer shim plate 18 with respect to the outer claw portions 5E of the caliper 5.

When the friction pad 15 is urged to be displaced circumferentially by the dragging rotational force from the disk 1 during a braking operation, because sliding takes place more easily between the inner shim plate 17 and the outer shim plate 18 than between the outer shim plate 18 and the outer claw portions 5E of the caliper 5, the friction pad 15, together with the inner shim plate 17, slides relative to the outer shim plate 18, while the outer shim plate 18 maintains a state in which it is in contact with the outer claw portions 5E of the caliper 5 approximately at a constant position. Thus, force from the disk 1 that acts on the outer claw portions 5E of the caliper 5 in the rotational direction is reduced.

The area of contact between the inner shim plate 17 and the outer shim plate 18 is held under the condition of a small friction coefficient $\mu1$ by the lubricant. On the other hand, a slight gap occurs between the outer shim plate 18 and each outer claw portion 5E of the caliper 5 when the brake is released, and dust or other foreign matter externally entering the gap is likely to increase the friction coefficient $\mu2$. Therefore, in the course of using the disk brake, it becomes still easier for the outer shim plate 18 to slide relative to the inner shim plate 17 than to the outer claw portions 5E. Accordingly, force from the disk 1 that acts on the outer claw portions 5E in the rotational direction is reduced over a long period of time.

Thus, in this embodiment, when the friction pad 15 is displaced in the circumferential direction by the dragging rotational force from the disk 1, the inner shim plate 17, which is secured to the friction pad 15, slides relative to the outer shim plate 18, which is in contact with the outer claw portions 5E of the caliper 5. Therefore, a part of the rotational force from the disk 1 can be relieved by the sliding motion. Accordingly, it is possible to reliably reduce rotational force from the disk 1 that acts on the outer claw portions 5E of the caliper 5 through the friction pad 15 and so forth.

Further, the friction coefficient $\mu1$ at the obverse side 18A1 of the outer shim plate 18 with respect to the inner shim plate 17 is set smaller than the friction coefficient $\mu2$ at the reverse side 18A2 of the outer shim plate 18 with respect to the outer claw portions 5E of the caliper 5, thereby enabling the inner shim plate 17 to slide smoothly relative to the outer shim plate 18 when rotational force from the disk 1 acts on the inner shim plate 17. Thus, it is possible to surely prevent the outer shim plate 18 and the outer claw portions 5E of the caliper 5 from wearing at a high rate by sliding contact therebetween.

Thus, it is possible, according to this embodiment, to surely suppress tilting of the caliper 5 with respect to the disk 1 which would otherwise occur when rotational force from the disk 1 acts strongly on the outer claw portions 5E during a braking operation, thus enabling the surface pressure of the outer claw portions 5E for pressing the friction pad 15 to be kept uniform. Consequently, non-uniform wear of the friction pad 15 can be surely prevented, and the lifetime of the friction pad 15 can be increased to a considerable extent. Moreover, it is possible to reduce the dragging torque and the brake noise and hence possible to improve the brake performance.

Further, both sides of the inner shim plate 17 are formed from a material which has a relatively large coefficient of friction and which is softer than the backing plate 16 of the friction pad 15, e.g. a hard rubber or a resin material, and the outer shim plate 18 is formed from an anti-corrosive metal plate, e.g. a stainless steel plate. Therefore, the backing plate 16 and the outer shim plate 18 can be surely prevented from wearing at a high rate, and it is possible to reliably prevent the generation of an extraordinary sound (metallic sound) between the inner shim plate 17 and the backing plate 16 or the outer shim plate 18. It is also possible to improve the durability and external appearance of the outer shim plate 18.

Further, because the contact surfaces of the inner shim plate 17 and the outer shim plate 18 are coated with a lubricant, these plates can smoothly slide relative to each other. Even when the inner shim plate 17 is formed from a material having a large coefficient of friction, e.g. rubber, the friction coefficient $\mu 1$ at the obverse side 18A1 of the outer shim plate 18 with respect to the inner shim plate 17 can be held sufficiently smaller than the friction coefficient $\mu 2$ at the reverse side 18A2 with respect to the caliper 5.

The guide recesses 16C and 16E of the backing plate 16 are formed such that the bottoms of the guide recesses 16C and 16E extend parallel to each other in the tangential direction, and the outer shim plate 18 is mounted by engaging the guide claw portions 18B and 18C in the corresponding guide recesses 16C and 16E of the backing plate 16. Therefore, the outer shim plate 18 can be smoothly guided in the circumferential direction of the disk 1 by the guide claw portions 18B and 18C, and the outer shim plate 18 can be surely prevented from being displaced in the radial direction of the disk 1 between the inner shim plate 17 and the outer claw portions 5E of the caliper 5.

Figure 8:
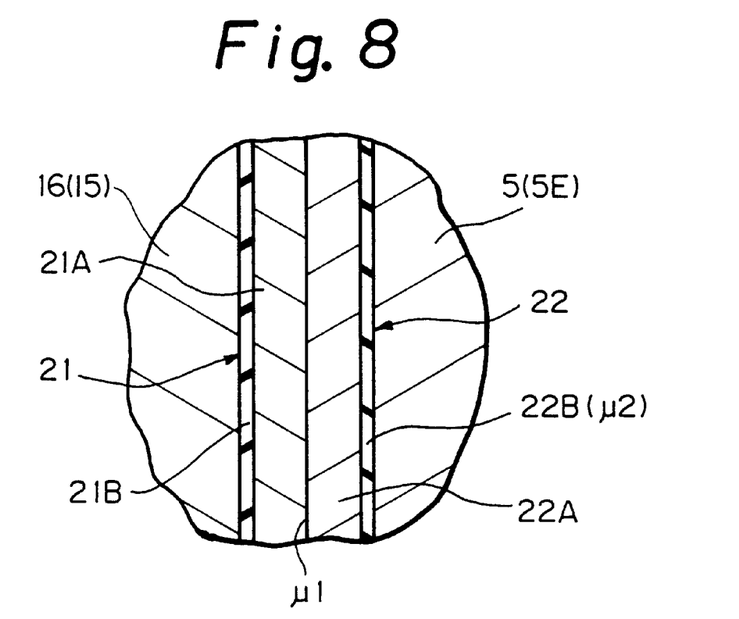
FIG. 8 is an enlarged vertical sectional view showing shim plates of a disk brake according to a second embodiment of the present invention, together with a friction pad and a caliper.

Further, the length L2 of the outer shim plate 18 is set slightly shorter than the distance L1 between the torque receiving portions 3A of the mounting member 2, and the outer shim plate 18 can contact each torque receiving portion 3A through the associated bent portion 18D. Therefore, it is possible to surely limit the displacement of the outer shim plate 18 relative to each torque receiving portion 3A in the circumferential direction of the disk 1. When the inner shim plate 17 is displaced circumferentially between the torque receiving portions 3A, together with the friction pad 15, the inner shim plate 17 can slide relative to the outer shim plate 1. FIG. 8 shows a second embodiment of the present invention. In this embodiment, the same constituent elements as those in the first embodiment are denoted by the same reference numerals, and a description thereof is omitted. The feature of this embodiment resides in that both an inner shim plate 21 and an outer shim plate 22 are formed from anti-corrosive metal plates, and these plates are coated with a rubber or other similar material.

The inner shim plate 21 has a metal plate portion 21A formed from an anti-corrosive metal plate, e.g. a stainless steel plate, in almost the same way as the inner shim plate 17 in the first embodiment. The inner shim plate 21 further has a coating layer 21B formed by coating the obverse side of the metal plate portion 21A with a rubber or resin material, for example.

The outer shim plate 22 has a metal plate portion 22A approximately similar to the outer shim plate 18. A coating layer 22B of a rubber or resin material, for example, is securely formed on the reverse side of the metal plate portion 22A.

The inner shim plate 21 contacts the backing plate 16 of the friction pad 15 through the coating layer 21B, and the outer shim plate 22 contacts the outer claw portions 5E of the caliper 5 through the coating layer 22B.

This embodiment, arranged as stated above, provides advantageous effects approximately similar to those in the first embodiment. In particular, this embodiment enables the friction coefficient $\mu 2$ of the outer shim plate 22 with respect to the outer claw portions 5E of the caliper 5 to be larger than the friction coefficient $\mu 1$ between the metal plate portions 21A and 22A. Accordingly, it is possible to surely prevent the outer shim plate 22 from sliding relative to the outer claw portions 5E.

Figure 9:
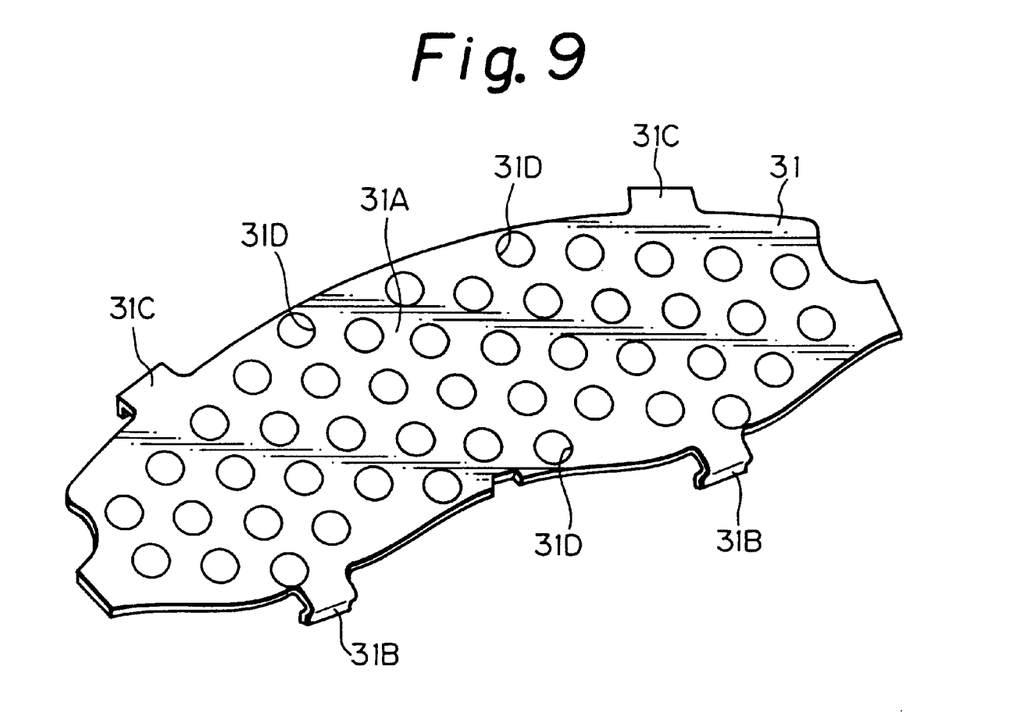
FIG. 9 is a perspective view showing an inner shim plate of a disk brake according to a third embodiment of the present invention.
Figure 10:
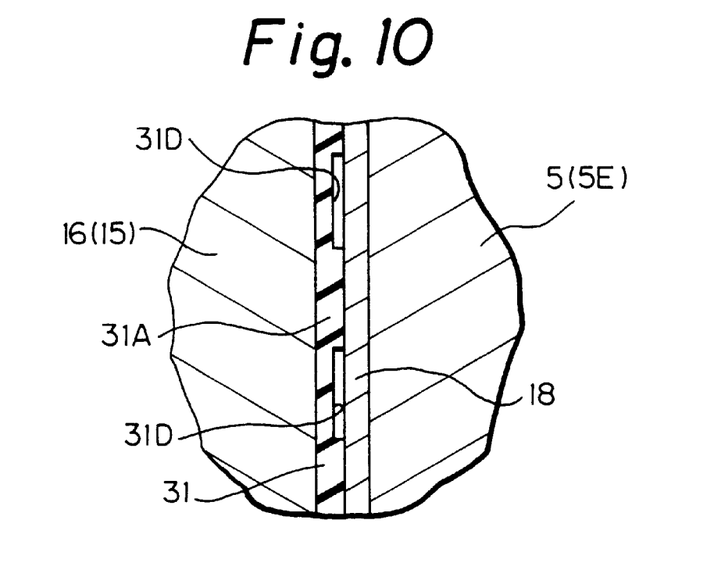
FIG. 10 is an enlarged vertical sectional view similar to FIG. 7, showing the inner shim plate in FIG. 8, together with the outer shim plate, the friction pad and the caliper.

FIGS. 9 and 10 show a third embodiment of the present invention. In this embodiment, the same constituent elements as those in the first embodiment are denoted by the same reference numerals, and a description thereof is omitted. The feature of this embodiment resides in that the reverse side of an inner shim plate 31 is provided with a plurality of shallow recesses 31D for retaining a lubricant.

The inner shim plate 31 is approximately similar to the inner shim plate 17 in the first embodiment. That is, the inner shim plate 31 is formed from a steel plate coated with a rubber or resin material, for example. The inner shim plate 31 has a shim body 31A and securing claw portions 31B and 31C. The reverse side of the shim body 31A is provided with circular recesses 31D which are distributed substantially uniformly to store a part of the lubricant applied between the inner shim plate 31 and the outer shim plate 18, as shown in FIG. 10.

Figure 11:
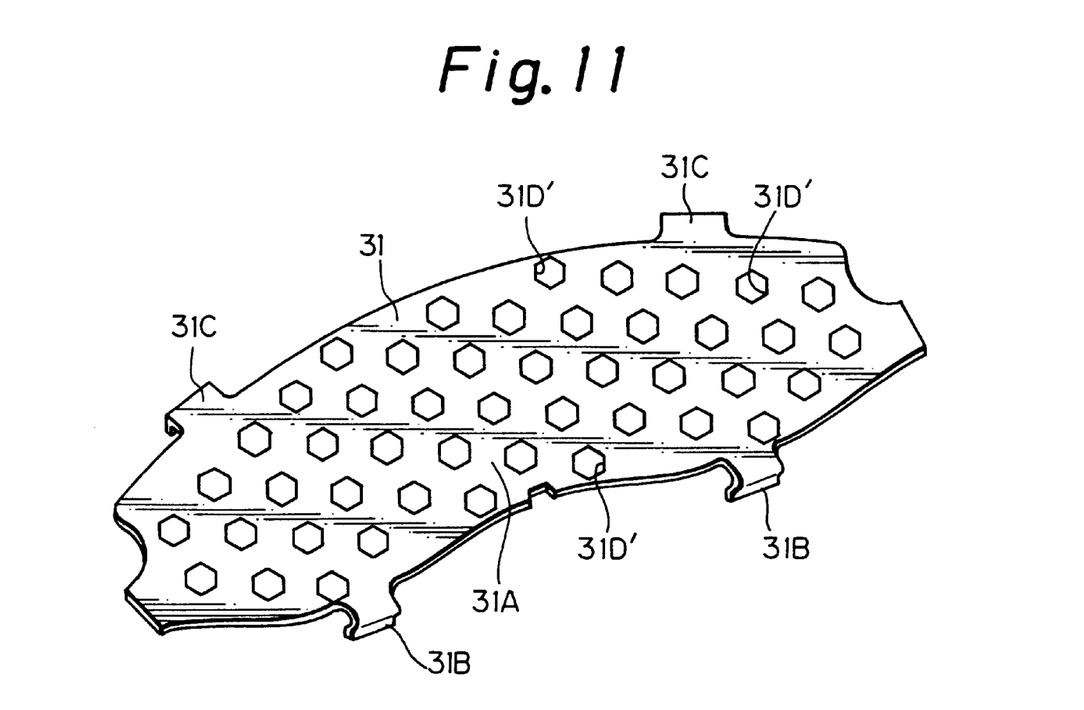
FIG. 11 is a perspective view of an inner shim plate of a disk brake according to a modification of the third embodiment.

As shown in FIG. 11, which illustrates a modification of this embodiment, the inner shim plate 31 may be provided with hexagonal or honeycomb-shaped recesses 31D'. It is also possible to form each recess in an oval shape.

This embodiment, arranged as stated above, provides advantageous effects approximately similar to those in the first embodiment. In particular, this embodiment enables a part of the lubricant applied between the inner shim plate 31 and the outer shim plate 18 to be stored in the recesses 31D (31D') and hence permits the contact surfaces of the inner and outer shim plates 31 and 18 to be continuously lubricated with the lubricant supplied from the recesses 31D (31D'). Accordingly, rotational force from the disk 1 that acts on the caliper 5 can be reduced over a further extended period of time by smooth sliding between the inner shim plate 31 and the outer shim plate 18.

Although in the first and third embodiments the inner shim plate 17 is formed by coating both sides of a steel plate or the like with a hard rubber or resin material, for example, it should be noted that the present invention is not necessarily limited thereto, and that the inner shim plate 17 may be constructed by forming a relatively hard rubber or resin material, for example, into a plate-like shape.

In the second embodiment, both the inner shim plate 21 and the outer shim plate 22 are formed from stainless steel plates, and surfaces of these plates which are reverse to the contact surfaces are provided with a coating of a rubber or the like. However, the present invention is not necessarily limited thereto. The arrangement may be such that the inner and outer shim plates are formed from steel plates or the like, and that the contact surfaces of these plates are coated or plated with an anti-corrosive material, e.g. a stainless steel or a resin material, and surfaces of the plates which are reverse to the contact surfaces are provided with a coating of a rubber or the like.

Although in the foregoing embodiments the inner friction pad 10 is provided with the shim plates 13 and 14, the present invention is not necessarily limited thereto. The inner shim plate 17 and the outer shim plate 18 may be provided for the inner friction pad 10.

Although in the foregoing embodiments the disk brake is applied to an automobile, the present invention is not necessarily limited thereto but may be applied to other vehicles, e.g. two-wheeled vehicles and electric railcars.

Although in the foregoing embodiments the present invention has been described in regard to a twin-bore type disk brake, the present invention is also applicable to single-bore type disk brakes.

As has been detailed above, according to the present invention, a first shim plate is provided with securing claw portions which are engaged with a friction pad, and a second shim plate is slidably mounted at the rear of the friction pad. Moreover, the coefficient of friction between the first and second shim plates is set smaller than the coefficient of friction between the second shim plate and the caliper. Therefore, when the first shim plate is displaced circumferentially together with the friction pad during a braking operation, the first shim plate can smoothly slide relative to the second shim plate. The second shim plate can maintain a predetermined contact position with respect to the caliper, and rotational force from the disk that acts on the caliper can be reliably reduced by sliding between the first and second shim plates. Accordingly, it is possible to surely suppress tilting of the caliper with respect to the disk which would otherwise occur when rotational force from the disk acts strongly on the caliper during a braking operation. Thus, the surface pressure on the caliper side for pressing the friction pad can be held uniform. Moreover, non-uniform wear of the friction pad can be surely prevented, and the lifetime of the friction pad can be increased to a considerable extent. Further, the dragging torque and brake noise of the disk brake can be reduced, and the brake performance can be improved. The second shim plate covers the first shim plate coated with a rubber for the purpose of preventing brake noise, for example, so that the first and second shim plates slide relative to each other through the rubber coating. Therefore, the first shim plate does not wear, and thus the durability of the first shim plate can be improved.

In another arrangement, recesses are formed in the backing plate of the friction pad, and the second shim plate is provided with guide claw portions which are engaged in the recesses of the backing plate. Accordingly, the first shim plate is allowed to slide relative to the second shim plate while being guided by the guide claw portions of the second shim plate, together with the friction pad. Thus, rotational force from the disk that acts on the caliper through the friction pad and so forth can be surely reduced by sliding between the first and second shim plates.

In still another arrangement, the length of the second shim plate is set slightly shorter than the distance between the torque receiving portions. Accordingly, displacement of the second shim plate in the circumferential direction of the disk can be limited within a slight range defined between the second shim plate and each torque receiving portion. Thus, the second shim plate can be surely prevented from being circumferentially displaced to a considerable extent which would otherwise occur when the second shim plate is dragged by the first shim plate.

In a further arrangement, the second shim plate has bent portions provided at both ends thereof. Accordingly, even when the second shim plate is slightly displaced in the circumferential direction of the disk by being dragged by the first shim plate, either of the bent portions can be brought into contact with the associated torque receiving portion over a wide area of contact. Thus, the first shim plate is allowed to slide smoothly relative to the second shim plate, which is positioned between the torque receiving portions.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A disk brake for use with a disk, comprising:
   a torque receiving member adapted to be fixed to a non-rotating part of a vehicle;
   a caliper supported by said torque receiving member for sliding movement in an axial direction of the disk by a pin member that is fixed to one of said torque receiving member and said caliper;
   a friction pad provided between said caliper and the disk and adapted to be pressed against the disk by said caliper, said friction pad having a side remote from the disk;
   wherein said torque receiving member comprises pad guide portions for supporting said friction pad for axial sliding movement and torque receiving portions spaced from each other in a circumferential direction of the disk so that said torque receiving portions are engagable with said friction pad while permitting limited movement of said friction pad in the circumferential direction of the disk between said torque receiving portions;
   a first shim plate overlying said side of said friction pad remote from the disk, said first shim plate comprising a shim body and a plurality of securing claw portions extending from said shim body and engaging peripheral portions of said friction pad so as to prevent said first shim plate from moving relative to said friction pad in the circumferential and radial directions of the disk, and said first shim plate having a side remote from the disk; and
   a second shim plate overlying said side of said first shim plate remote from the disk, said second shim plate comprising a second shim body and a plurality of guide claw portions extending from said second shim body toward said friction pad such that said guide claw portions permit said second shim plate to slide on said first shim plate in at least the circumferential direction of the disk;
   wherein a coefficient of friction between a contact surface of said first shim plate and a contact surface of said second shim plate is smaller that a coefficient of friction between another contact surface of said second shim plate and a contact surface of said caliper so that when a braking force is applied to said friction pad, said friction pad can move in the circumferential direction of said disk relative to said shim plate and said caliper.

2. The disk brake of claim 1, wherein said contact surface of said first shim plate and said contact surface of said second shim plate are mutually facing and have a lubricant there between.

3. The disk brake of claim 2, wherein at least one of said contact surface of said first shim plate and said contact surface of said second shim plate has recesses for retaining a portion of said lubricant.

4. The disk brake of claim 1, wherein said contact surface of said second shim plate, facing said contact surface of said caliper, is coated with a material which provides a higher coefficient of friction between said another contact surface of said second shim plate and said contact surface of said caliper than if said material was not present.

5. The disk brake of claim 1, wherein said friction pad comprises a backing plate having a plurality of recesses that extend in the same tangential direction with respect to the circumferential direction and said guide claw portions of said second shim plate are engaged in said recesses such that said second shim plate is movable in the circumferential direction of the disk with respect to said friction pad.

6. The disk brake of claim 1, wherein said second shim plate has a length in the circumferential direction of said disk which is slightly shorter than the distance between said torque receiving portions of said torque receiving member.

7. The disk brake of claim 5, wherein said second shim plate has a length in the circumferential direction of said disk which is slightly shorter than the distance between said torque receiving portions of said torque receiving member.

8. The disk brake of claim 1, wherein said second shim plate comprises bent portions facing said torque receiving portions of said torque receiving member, said bent portions bending away from said friction pad in the axial direction of the disk.

9. The disk brake of claim 5, wherein said second shim plate comprises bent portions facing said torque receiving portions of said torque receiving member, said bent portions bending away from said friction pad in the axial direction of the disk.

10. The disk brake of claim 6, wherein said second shim plate comprises bent portions provided at respective positions facing said torque receiving portions of said torque receiving member, said bent portions bending away from said friction pad in the axial direction of the disk.

* * * * *

UNITED STATES PATENT AND TRADEMARK OFFICE
CERTIFICATE OF CORRECTION

PATENT NO. : 5,975,252
DATED : November 2, 1999
INVENTOR(S) : Shinji SUZUKI et al.

It is certified that error appears in the above-identified patent and that said Letters Patent is hereby corrected as shown below:

> Title page, item [75],
> correct the second inventor's last name to
> read as follows: --Ishii--.

Signed and Sealed this

First Day of August, 2000

Attest:

Q. TODD DICKINSON

*Attesting Officer*  *Director of Patents and Trademarks*